United States Patent
Yu et al.

(10) Patent No.: US 12,472,666 B2
(45) Date of Patent: Nov. 18, 2025

(54) DECORATED MOLDING ARTICLE

(71) Applicant: Jin Ya Dian Technology Co., Ltd., Taoyuan (TW)

(72) Inventors: Che-Ming Yu, New Taipei (TW); Kuo-Liang Ying, Taoyuan (TW)

(73) Assignee: Jin Ya Dian Technology Co., Ltd., Taoyuan (TW)

( * ) Notice: Subject to any disclaimer, the term of this patent is extended or adjusted under 35 U.S.C. 154(b) by 260 days.

(21) Appl. No.: 18/343,736

(22) Filed: Jun. 28, 2023

(65) Prior Publication Data
US 2024/0066769 A1  Feb. 29, 2024

(30) Foreign Application Priority Data

Aug. 30, 2022  (TW) .................................. 111209398
Oct. 4, 2022   (TW) .................................. 111210840

(51) Int. Cl.
*B29C 45/00*  (2006.01)
*B29C 45/14*  (2006.01)

(52) U.S. Cl.
CPC .... *B29C 45/14688* (2013.01); *B29C 45/0001* (2013.01); *B29C 45/14811* (2013.01); *B29C 2045/14713* (2013.01); *B29C 2045/14918* (2013.01); *B29K 2995/007* (2013.01); *B29K 2995/0089* (2013.01)

(58) Field of Classification Search
None
See application file for complete search history.

(56) References Cited

U.S. PATENT DOCUMENTS

2021/0001611 A1*  1/2021  Ueno .................... B32B 7/027

FOREIGN PATENT DOCUMENTS

JP      3236042      1/2022

OTHER PUBLICATIONS

"Search Report of Europe Counterpart Application", issued on Apr. 29, 2024, pp. 1-10.

* cited by examiner

*Primary Examiner* — Kim S. Horger
(74) *Attorney, Agent, or Firm* — JCIPRNET

(57) ABSTRACT

Provided is a decorated molding article includes a workpiece and a molded film attached to an outer surface of the workpiece or an inner surface of the workpiece. Compared with the printing layer in the conventional In Mold Label (IML) and InSert molding (INS) that is made by a plurality of anti-impact and bonding processes, a plurality of stacked decorative layers of the embodiment not only provide various color effects, but also directly combined with injection molding material to form part products and have both a protection effect and an adhesive effect. Further, the present disclosure can effectively simplify the manufacturing steps of the composite layer structure and reduce the manufacturing cost.

10 Claims, 13 Drawing Sheets

DECORATED MOLDING ARTICLE

CROSS-REFERENCE TO RELATED APPLICATION

This application claims the priority benefit of Taiwan application serial no. 111209398, filed on Aug. 30, 2022 and Taiwan application serial no. 111210840, filed on Oct. 4, 2022. The entirety of each of the above-mentioned patent applications is hereby incorporated by reference herein and made a part of this specification.

BACKGROUND

Technology Field

The disclosure relates to a decorated molding article.

Description of Related Art

Generally speaking, decorations such as patterns or texts formed on the surface of an object shell are mainly formed through a spraying or printing process in order to present a specific visual effect and increase the variety of the appearance of the object. A conventional forming method is to spray a hardened layer on the surface of the shell after the shell of the related product is completed. This method has a cumbersome process, poor yield, and may cause organic solvent gas pollution, leading to many pollution problems. On the other hand, the spraying process has the disadvantages of time-consuming, complicated process, and low thickness uniformity, so it is not suitable for mass production.

To solve the problems, various specific decoration processes using decorative films have been proposed. For example, in-mold decoration (IMD) or out mold decoration (OMD) has become an alternative for forming surface graphics.

Currently, the commonly used polymer substrate materials in in-mold decoration include polycarbonate (PC), polymethyl methacrylate, also known as poly(methyl methacrylate) (PMMA), polyethylene terephthalate (PET), and acrylonitrile-butadiene-styrene (ABS). However, a substrate including PC and ABS has a low level of hardness, which subjects the surface of the substrate to damage. Therefore, generally the substrate is coated with a protective layer to increase the hardness and scratch resistance of the substrate surface. On the other hand, a substrate including PMMA has a high level of hardness, but it is easy to crack during forming, leading to difficulty in performing a hot press process.

To solve the problems, various specific decoration processes using decorative films have been proposed. For example, in-mold decoration (IMD) or out mold decoration (OMD) has become an alternative for forming surface graphics.

Specifically, in-mold decoration (IMD) may include in mold labeling (IML), in mold film (IMF or INS), and in mold roller (IMR) as shown in Table 1. In mold labeling (IML) is characterized by a hardened transparent film on the surface, a printed pattern layer in the middle, and a plastic layer on the back. The ink is sandwiched between the hardened transparent film and the plastic layer, so the surface of the product may be prevented from being scratched, it is abrasion-resistant, and the color brightness may last and does not fade easily for a long time. The IML process flow is as follows:

(1) Cutting: take the roll-shaped film substrate (usually PMMA/PC or PET or PC substrate with hard coating), and cut it into the designed size for printing and blister molding.

(2) Plane printing: usually screen printing (silk screen printing), ink-jet printing process for providing graphics, text effects and final anti-impact adhesive materials, and generally the number of the printings is determined according to the effect of the product design, especially the anti-impact adhesive material need to be matched with the high-temperature and high-pressure injection molding plastic materials (generally, the injection molding temperature is about 200° C. or higher), so usually need to print a plurality of stacks, which results in increased costs, reduced film usage efficiency, and reduced overall yield.

(3) Ink drying: the printed ink is baked and dried at high temperature to ensure the physical properties of the ink.

(4) Adhering protective film: to prevent the post-punching positioning hole from damaging the surface of the printed film, so a protective film must be attached to protect the surface.

(5) Punching positioning hole: since the film will shrink during the molding and heating process, it is necessary to punch the positioning hole design, which is to ensure the precision of the positioning of the printed film and its matching product.

(6) High-temperature and high-pressure molding: after the printed film is subjected to high temperature and high heat steps, the molding machine is used for blistering under preheating condition.

(7) Cutting shape: use blade cutting or laser cutting to cut off the waste of the three-dimensional film after blistering.

(8) Injection molding: finally, place the cut three-dimensional film on the injection molding machine for injection molding to form final product and perform related physical inspection of shipments.

The in mold roller (IMR) is to print a pattern on the film, and through a film feeder, the film is attached to the mold cavity and then injected. After the injection, the patterned ink layer is separated from the film, the ink layer is left on the plastic part, and a plastic part with a decorative pattern on the surface is obtained. Therefore, the surface of the final product processed by in mold roller does not have a transparent protective film, and the film is only a carrier in the production process. That is, the biggest difference between in mold labeling (IML) and in mold roller (IMR) is whether there is a transparent protective film on the surface of the product. Moreover, in mold film (IMF) is similar to in mold labeling (IML).

TABLE 1

| model | Introduction |
|---|---|
| IMR | In mold roller: the film peels off and does not remain on the surface after ink transfer. The surface of the final product does not have a transparent protective film, and the film is only a carrier in the production process. The degree of automation in |

TABLE 1-continued

| model | Introduction |
|---|---|
| | production is high and the cost of mass production is low. The disadvantage is that the printed pattern layer is thin on the surface of the product. After the product is used for a period of time, the printed pattern layer is easily worn off, and the color is also easy to fade, resulting in an unsightly surface. |
| IML | In mold labeling: the film may remain in the appearance to form a protective layer. The surface is a hardened transparent film, the middle is a printed pattern layer, and the back is a plastic layer. The ink is sandwiched in the middle, so the surface of the product may be prevented from scratches and abrasion, and the color brightness may last and does not fade easily for a long time. |
| INS | INS process is to form a glue film after film printing and bonding to the substrate, and the glue film may be formed as a product by performing 3D molding, then being cut and injected. |

SUMMARY

The disclosure provides a decorated molding article including a workpiece; and a molded film attached to an outer surface of the workpiece. The molded film includes a substrate, having a first surface and a second surface opposite to each other; a first decoration layer, disposed on the first surface of the substrate; a second decoration layer, disposed on the first decoration layer; and an optical hardening layer, disposed on the second decoration layer. The first decoration layer, the second decoration layer, and the optical hardening layer each include a protective material, an ink material, and a bonding material, and the optical hardening layer has a flat top surface.

In an embodiment of the disclosure, a content of the protective material in the optical hardening layer is higher than a content of the protective material in the first decoration layer, and higher than a content of the protective material in the second decoration layer.

The disclosure provides a decorated molding article including a workpiece; and a molded film attached to an outer surface of the workpiece. The molded film includes a substrate, having a first surface and a second surface opposite to each other; an optical hardening layer, disposed on the first surface of the substrate; a plurality of decoration layers, disposed on the second surface of the substrate; and an anti-impact adhesive layer, disposed between the plurality of decoration layers and the outer surface of the workpiece. A content of a bonding material in the anti-impact adhesive layer is higher than a content of a bonding material in the plurality of decoration layers.

The disclosure provides a decorated molding article including a workpiece; and a molded film attached to an outer surface of the workpiece. The molded film includes a substrate, having a first surface and a second surface opposite to each other; a first composite layer structure, disposed on the first surface of the substrate, wherein the first composite layer structure comprises a transmitting layer and an optical hardening layer, wherein the optical hardening layer has a flat top surface; and a second composite layer structure, disposed on the second surface of the substrate, wherein the second composite layer structure comprises a decoration layer and an anti-impact adhesive layer, and the anti-impact adhesive layer is in contact with the outer surface of the workpiece. A content of a bonding material in the anti-impact adhesive layer is higher than a content of a bonding material in the decoration layer.

The disclosure provides a decorated molding article including a workpiece; and a molded film attached to an outer surface of the workpiece. The molded film includes a substrate, having a first surface and a second surface opposite to each other; a decoration layer, disposed on the first surface of the substrate; and an optical hardening layer, disposed on the decoration layer, wherein the second surface of the substrate is in contact with the outer surface of the workpiece. The optical hardening layer has a flat top surface, and a content of a protective material in the optical hardening layer is higher than a content of a protective material in the decoration layer.

The disclosure provides a decorated molding article including a workpiece; and a molded film attached to an outer surface of the workpiece. The molded film includes a substrate, having a first surface and a second surface opposite to each other; a first decoration layer, disposed on the first surface of the substrate; a second decoration layer, disposed between the first decoration layer and the first surface of the substrate; an optical hardening layer, disposed on the first decoration layer, wherein the optical hardening layer has a flat top surface; and an anti-impact adhesive layer, disposed on the second surface of the substrate, and being in contact with the outer surface of the workpiece. A content of a bonding material in the anti-impact adhesive layer is higher than a content of a bonding material in the first decoration layer, and higher than a content of a bonding material in the second decoration layer.

The disclosure provides a decorated molding article including a workpiece; and a molded film attached to an inner surface of the workpiece. The molded film includes a substrate, having a first surface and a second surface opposite to each other; a first decoration layer, disposed on the first surface of the substrate; a second decoration layer, disposed on the first decoration layer; and an anti-impact adhesive layer, disposed on the second decoration layer. The first decoration layer, the second decoration layer, and the anti-impact adhesive layer each include a protective material, an ink material, and a bonding material. A content of the bonding material in the anti-impact adhesive layer is higher than a content of the bonding material in the first decoration layer, and higher than a content of the bonding material in the second decoration layer.

The disclosure provides a decorated molding article including a workpiece; and a molded film attached to an inner surface of the workpiece. The molded film includes a substrate, having a first surface and a second surface opposite to each other, wherein the first surface of the substrate is in contact with the inner surface of the workpiece; a first decoration layer, disposed on the second surface of the substrate; and a second decoration layer, disposed between the first decoration layer and the substrate. The first decoration layer has a flat top surface.

In an embodiment of the disclosure, the first decoration layer and the second decoration layer have different ink materials.

The disclosure provides a decorated molding article including a workpiece; and a molded film attached to an inner surface of the workpiece. The molded film includes a substrate, having a first surface and a second surface opposite to each other; a first decoration layer, disposed on the first surface of the substrate; a second decoration layer, disposed between the first decoration layer and the first surface of the substrate; and an anti-impact adhesive layer, disposed on the first decoration layer, so that a top surface of the anti-impact adhesive layer is in contact with the inner surface of the workpiece. A content of a bonding material in the anti-impact adhesive layer is higher than a content of a bonding material in the first decoration layer, and higher than a content of a bonding material in the second decoration layer.

In summary, in the disclosure, the all-in-one coating is formed on the substrate and the curing step is performed to form a composite layer structure with protective effects, color effects, and bonding effects. This composite layer structure may form a molded film with better physical properties (e.g., higher hardness, better protection effect, and the like) after the blister molding process. In addition, compared to the ink layer or printing layer in the conventional INS that needs to be matched with the substrate bonding process, a plurality of stacked decoration layers in the present embodiment not only provide a variety of color effects, but also have the protective effect and the bonding effect, while no additional bonding process is required. Further, compared with the conventional IML technology, which needs to form additional 3-10 anti-impact adhesive layers to be attached to the workpiece, the present embodiment does not need to form any additional adhesive layer. That is, the disclosure can effectively simplify the manufacturing steps of the composite layer structure, and provide the composite layer structure with better protective effect and the bonding effect. Furthermore, compared with the conventional spraying technology, INS technology or IML technology, the manufacturing steps of the decorated molding article of the disclosure are more simplified, thereby effectively reducing the manufacturing cost.

DESCRIPTION OF THE EMBODIMENTS

Figure 1:
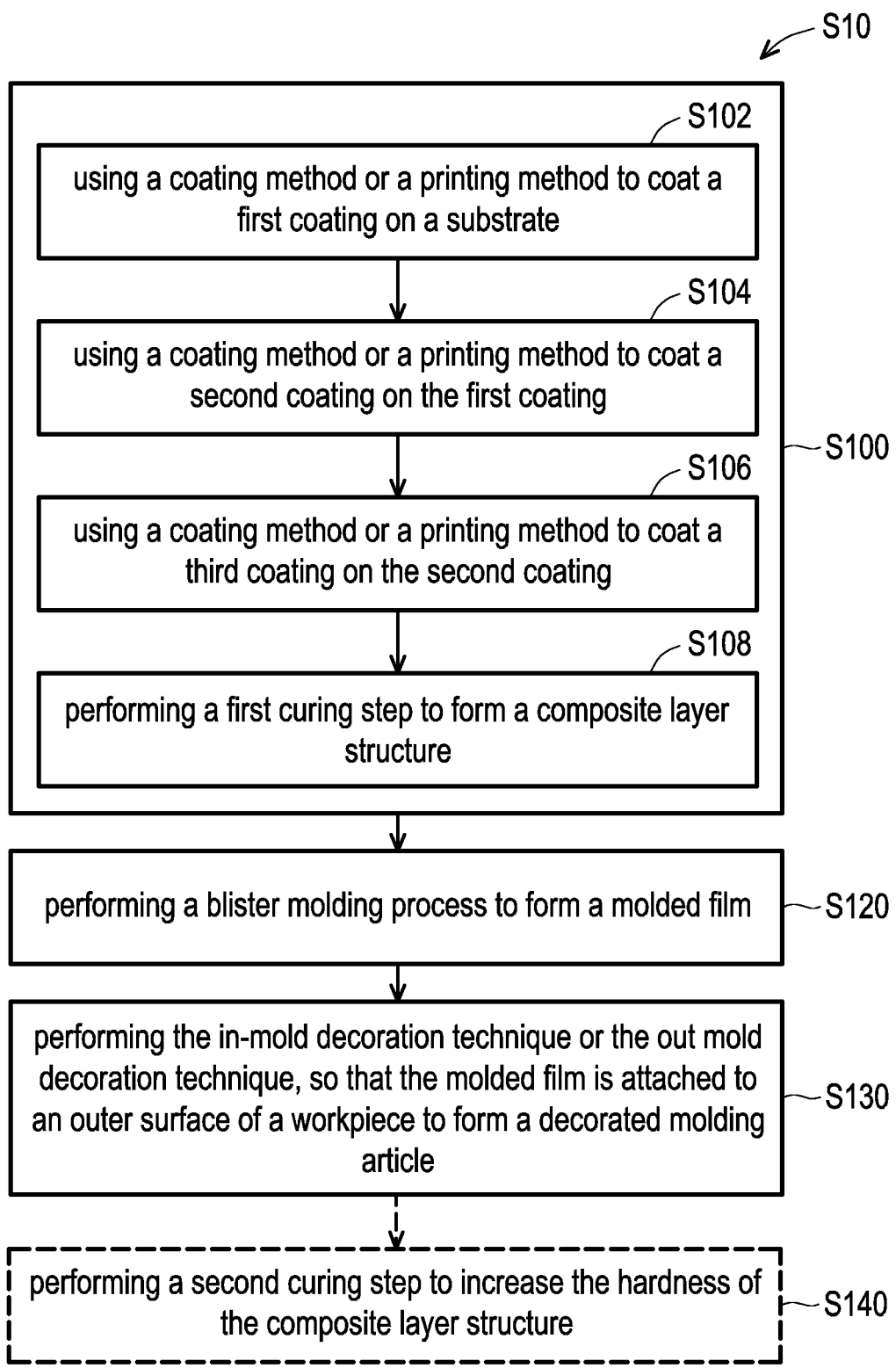
FIG. 1 is a flow chart illustrating a method of fabricating a decorated molding article according to a first embodiment of the disclosure.

In the subsequent paragraphs, the disclosure will be described holistically with reference to the accompanying drawings. However, the disclosure may be implemented in many different forms and is not limited to the embodiments illustrated in the text. Directional terminology mentioned in the following embodiments, such as such as "top", "bottom", etc., is used with reference to the orientation of the drawings being described. Therefore, the used directional terminology is only intended to illustrate, rather than limit, the disclosure. Moreover, for clarity, a thickness of each film layer and region may be enlarged. The same or similar elements will be given the same or similar reference numerals and their description will be omitted in the subsequent paragraphs.

Figure 2:
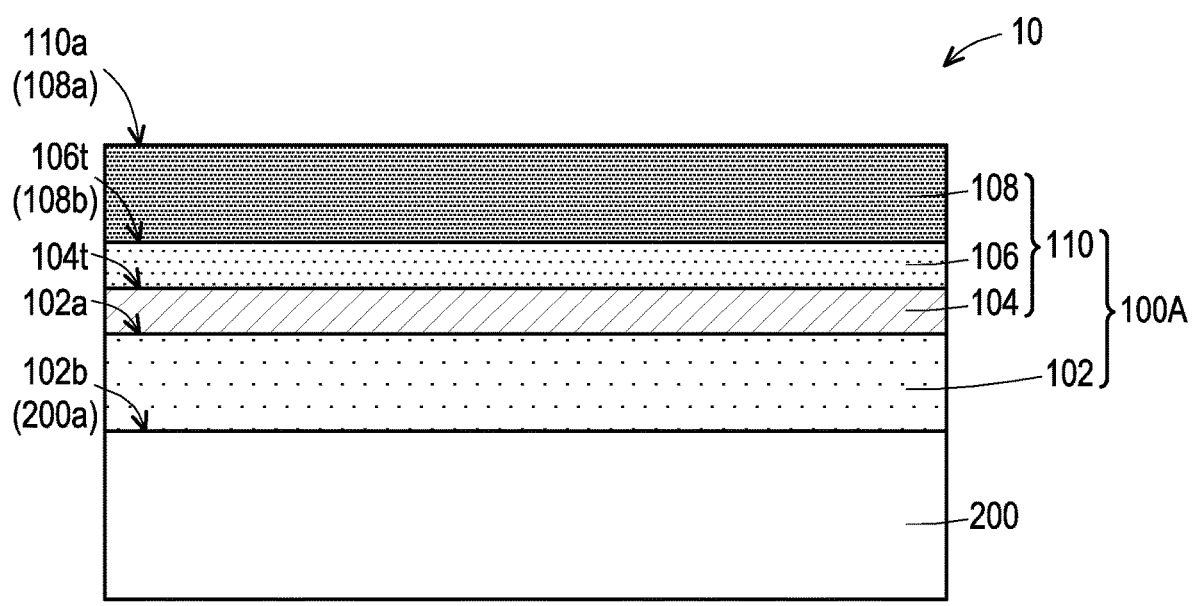
FIG. 2 is a schematic cross-sectional view of the decorated molding article according to the first embodiment of the disclosure.

FIG. 1 is a flow chart illustrating a method of fabricating a decorated molding article according to a first embodiment of the disclosure. FIG. 2 is a schematic cross-sectional view of the decorated molding article according to the first embodiment of the disclosure.

Referring to FIG. 1 and FIG. 2, the first embodiment of the disclosure provides the fabricating method S10 of a decorated molding article 10 as follows. Step S100 is performed to form a composite layer structure 110 (as shown in FIG. 2). Specifically, the step of forming the composite layer structure 110 includes steps as follows. Step S102 is performed. A coating method or a printing method is used to form a first coating on a substrate 102 (as shown in FIG. 2). In one embodiment, the material of the substrate 102 includes acrylonitrile-butadiene-styrene copolymer (ABS), polycarbonate (PC), polymethyl methacrylate (PMMA), or a combination thereof, and the method of forming the same includes extrusion molding method and so on. For example, the ABS solid plastic may be heated, melted, extruded, and cooled to form the ABS substrate 102 by an extrusion molding method. Moreover, ABS solid plastic may be mixed with color masterbatch, pigments, pearl powder, and related additives to form a mixture. Then, the mixture is extruded by an extrusion molding method to form another ABS substrate, so that the ABS substrate has visual effects such as colors, pearly luster, a bright surface, a mirror surface, a lusterless matte surface, and the like. In alternative embodiments, the material of the substrate 102 may also be wood veneer, aluminum sheet, steel plate, the like. or a combination thereof.

Specifically, in the coating method, the coating material is distributed in a coating device, and the coating material is uniformly coated on the substrate 102 through the coating head of the coating device. In an embodiment, the opening of the coating head may be flat, so that the coating material coated on the substrate 102 has a bright surface effect. In another embodiment, the opening of the coating head may have multiple microstructures (e.g., micro-dents), so that the coating material coated on the substrate 102 has a matting effect. In an alternative embodiment, the opening of the coating head may have multiple concave-convex structures, so that the coating material coated on the substrate 102 has a hairline effect. On the other hand, the printing method may include an appropriate printing method such as gravure printing method, screen printing method, offset printing method, reverse printing method, transfer printing method, inkjet printing method, or the like. Compared with the coating method, the printing method may form a thinner film layer.

In an embodiment, the first coating at least includes a protective material, an ink material, and a bonding material which are uniformly mixed together. The protective material may include polymethyl methacrylate (PMMA), aliphatic urethane diacrylate, epoxy acrylate (EA), polyester polyol, or a combination thereof; the ink material may include polyurethane (PU) and similar materials; and the bonding material may include thermoplastic polyurethane (TPU), aromatic urethane diacrylate, or a combination thereof. Moreover, the first coating further includes a heat-resistant material, a solvent, and a hardener. In an embodiment, the heat-resistant material may include polycarbonate (PC) and similar materials; the solvent may include ethyl acetate, methyl ethyl ketone, toluene, xylene, or a combination thereof; and the hardener may include polyisocyanate and similar materials. However, the disclosure is not limited thereto. In other embodiments, the first coating may also include other additives, such as matting powder, pearl powder, and the like, so that a first decoration layer 104 (as shown in FIG. 2) formed in the subsequent process has different visual effects such as a matte surface and pearly luster.

Then, proceed to step S104. A second coating is formed on the first coating by using a coating method or a printing method. In one embodiment, the second coating includes at least a protective material, an ink material, and a bonding material uniformly mixed together. Moreover, the coating method, printing method, protective material, ink material, and bonding material have been illustrated in detail in the foregoing paragraphs, which are not iterated herein. Note that the first coating is used to form the first decoration layer 104, and the second coating is used to form a second decoration layer 106 as shown in FIG. 2. In the embodiment, the first coating and the second coating have different compositions to achieve different visual effects. In another embodiment, the decoration layers 104 or 106 may also use evaporation or sputtering to achieve a metalized decoration effect. For example, the first decoration layer 104 formed by the first coating may be a wood grain layer, and the second decoration layer 106 formed by the second coating may have a matte silver color, so that the composite layer structure 110 exhibits a matte silver color in a wood grain pattern.

Then, proceed to step S106. A third coating is formed on the second coating by using a coating method or a printing method. In one embodiment, the third coating includes at least a protective material, an ink material, and a bonding material uniformly mixed together. Moreover, the coating method, printing method, protective material, ink material, and bonding material have been illustrated in detail in the foregoing paragraphs, which are not iterated herein. Note that the third coating is used to form an optical hardening layer 108. In the embodiment, the content of the protective material in the third coating may be higher than the content of the protective material in the first coating or the second coating.

Subsequently, proceed to step S108. A first curing step is performed to form the composite layer structure 110. As shown in FIG. 2, the composite layer structure 110 includes the first decoration layer 104, the second decoration layer 106, and the optical hardening layer 108. The first decoration layer 104 may be disposed on a first surface 102*a* of the substrate 102. The second decoration layer 106 may be disposed on a top surface 104*t* of the first decoration layer 104. The optical hardening layer 108 may be disposed on a top surface 106*t* of the second decoration layer 106 such that the second decoration layer 106 is disposed between the first surface 102*a* of the substrate 102 and a bottom surface 108*b* of the optical hardening layer 108. Although only two decoration layers 104 and 106 are illustrated in FIG. 2, the disclosure is not limited thereto. In other embodiments, the composite layer structure 110 may also have multiple (e.g., three, four, or more layers) stacked decoration layers. Further, in addition to the coating method, the optical hardening layer 108 may also be formed on the top surface 106*t* of the second decoration layer 106 by using a laminating method, an embossing method, a 3D printing method or a jet printing method. In alternative embodiments, the material of the optical hardening layer 108 may also be a UV material or a thermal curing material.

In an embodiment, the first curing step may include a thermal curing step, an ultraviolet (UV) curing step, a combination thereof, or other suitable curing steps. This first curing step may cause the bonding material to undergo a cross-linking reaction and be bonded to the substrate 102. In the embodiment, the coating material may be regarded as an all-in-one coating material, which allows the cured composite layer structure 110 to have a protective effect, a color effect, and a bonding effect altogether. In this case, the composite layer structure 110 may also be referred to as an all-in-one composite layer structure. Compared with the steps in which the purchase of a protective layer is required and an adhesive film structure is formed through a printing and bonding process in the prior art, the disclosure may effectively facilitate the fabricating steps, reduce the fabricating cost, and prevent the pollution problems caused by the adhesive film.

Compared to the ink layer or printing layer in the conventional INS that needs to be matched with the substrate bonding process, a plurality of stacked decoration layers in the present embodiment not only provide a variety of color effects, but also have the protective effect and the bonding effect, while no additional bonding process is required. That is, the disclosure can effectively simplify the manufacturing steps of the composite layer structure, and provide the composite layer structure with better protective effect and the bonding effect. Furthermore, compared with the conventional spraying technology or INS technology, the manufacturing steps of the composite layer structure of the disclosure are more simplified, thereby effectively reducing the manufacturing cost.

In alternative embodiments, after one or more decoration layers are formed on the substrate 102 by the coating method or 3D printing method, some effects, such as forming logos or gradients, may be formed subsequently by using the 3D printing. Afterwards, the optical hardening layer is optionally formed by a laminating method, an embossing method, a 3D printing method or a jet printing method according to the situation.

After the composite layer structure 110 is formed, proceed to step S120. A blister molding process is performed to form a molded film 100A. In one embodiment, the blister molding process includes heating the composite layer structure 110 and the substrate 102 to soften the composite layer structure 110 and the substrate 102; putting the softened composite layer structure 110 and the substrate 102 into a mold and pressurizing them, so that the softened composite layer structure 110 and the substrate 102 are molded into a desired shape; performing a cooling step; and cutting the excess part to form the molded film 100A.

Then, proceed to step S130. The in-mold decoration technique or the out mold decoration technique are performed, so that the molded film 100A is attached to an outer surface 200a of a workpiece 200 to form the decorated molding article 10 as shown in FIG. 2. In one embodiment, the substrate 102 has a first surface 102a and a second surface 102b opposite to each other. As shown in FIG. 2, the second surface 102b of the substrate 102 is in contact with the outer surface 200a of the workpiece 200, the first surface 102a of the substrate 102 is in contact with the first decoration layer 104, and a top surface 110a of the composite layer structure 110 is exposed upward. In the embodiment, the top surface 110a of the composite layer structure 110 may be a visual surface, so that consumers may oversee the visual effect of the molded film 100A from the top surface 110a of the composite layer structure 110.

Figure 9:
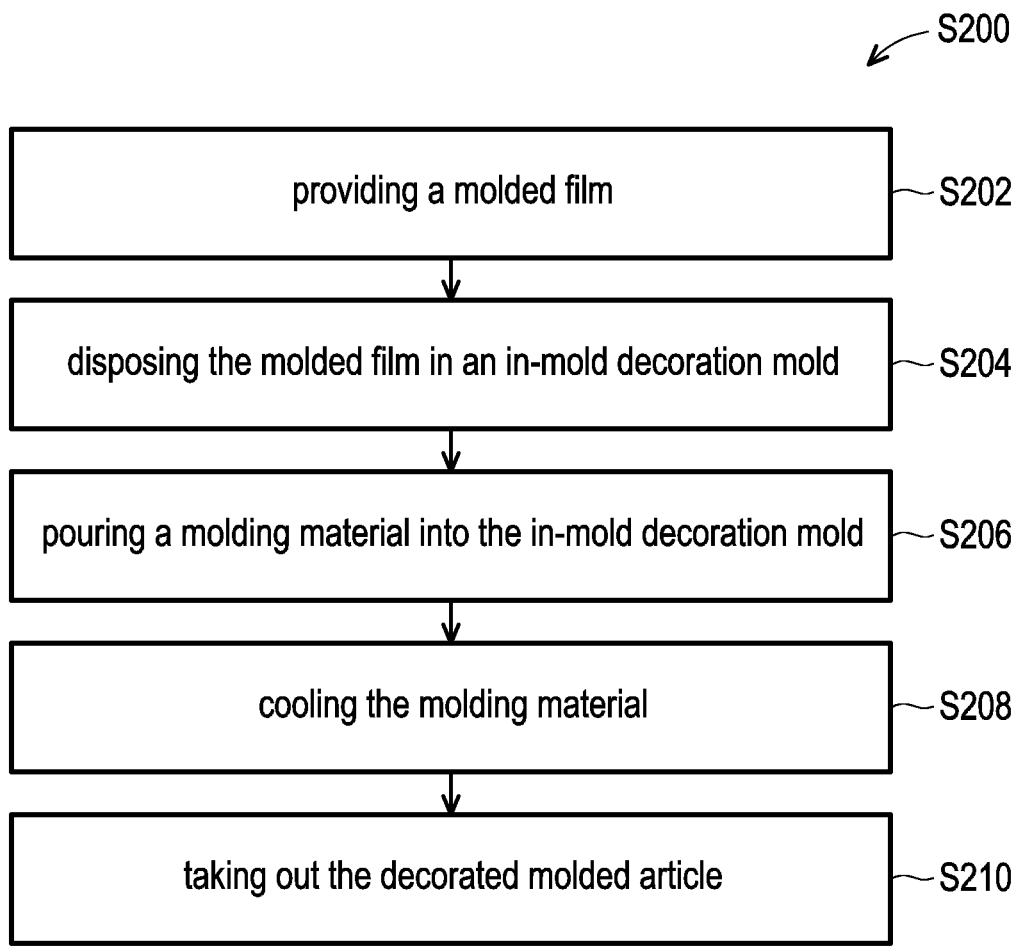
FIG. 9 is a flow chart illustrating an in-mold decoration technique according to an embodiment of the disclosure.
Figure 10:
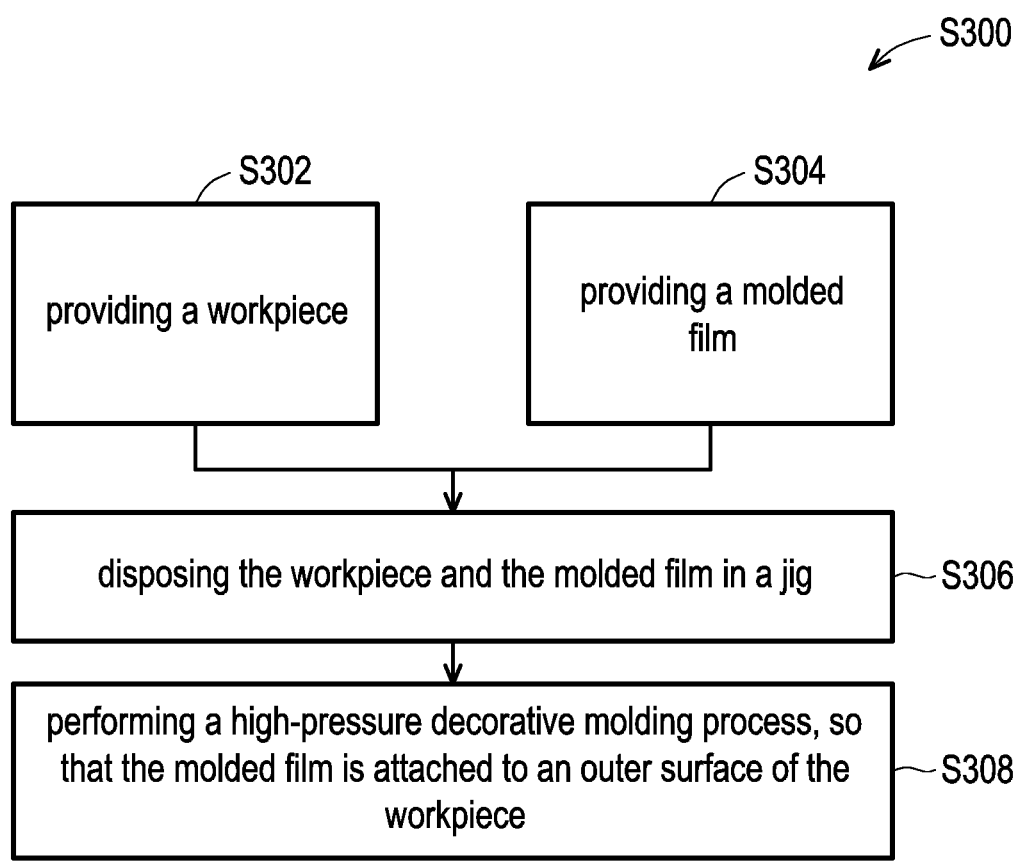
FIG. 10 is a flow chart illustrating an out mold decoration technique according to an embodiment of the disclosure.

FIG. 9 is a flow chart illustrating an in-mold decoration technique according to an embodiment of the disclosure. FIG. 10 is a flow chart illustrating an out mold decoration technique according to an embodiment of the disclosure.

Referring to FIG. 9, the step S200 of the in-mold decoration technique is illustrated as follows. First, step S202 is performed to provide a molded film. This molded film may be the molded film 100A, for example. The composition of the molded film 100A has been illustrated in the foregoing paragraphs, which is not iterated herein.

Next, proceed to step S204. The molded film 100A is disposed in the in-mold decoration mold. Specifically, the in-mold decoration mold includes a hollow mold cavity. The mold cavity has a surface. Subsequently, the molded film 100A is attached to the surface of the mold cavity so that the molded film 100A covers at least a part of the surface of the mold cavity. In an alternative embodiment, before step S206, a heating pre-forming process may be selectively performed and the excess film may be removed by die cutting, laser cutting, or waterjet cutting.

Then, proceed to step S206. The molding material is poured into the mold cavity of the in-mold decoration mold, so that the molding material and the molded film 100A are combined with each other. In one embodiment, the molding material may be suitable for molding, such as plastic material, resin material, metal material, carbon fiber material, glass, and the like.

Subsequently, proceed to step S208. The molding material is cooled to form the workpiece 200. The workpiece 200, subject to the application of the decorated molding article of the disclosure, may be an electronic device housing or component, a vehicle housing or component, or a combination thereof. For example, the workpiece 200 may be mobile phones, digital cameras, personal digital assistants (PDAs), laptop computers, desktop computers, touch panels, TVs, satellite positioning system (GPS) devices, car monitors, navigation devices, displays, digital photo frames, DVD players, automotive interior trim panels (e.g. handles, trim strips, touch front bumpers, and the like), car exterior decorative panels (e.g. exterior handles, back door decorative strips, welcome pedals, and the like), car dashboards, car logos, intelligent keys (I-key), engine start buttons, clocks, radios, toys, watches, or other housings or components used in electronic products that require power. However, the disclosure does not limit the shape and structure of the workpiece 200, and as long as the shape and structure of the workpiece 200 may be implemented by the in-mold decoration technique, they are within the scope of the disclosure.

Next, proceed to step S210. The decorated molding article 10 is taken out from the in-mold decoration mold. The obtained decorated molding article 10 has been illustrated in detail in FIG. 2, which is not iterated herein.

On the other hand, the decorated molding article 10 may also be fabricated by out mold decoration technique. Referring to FIG. 10, the step S200 of the out mold decoration technique is illustrated as follows. First, step S302 is performed to provide the workpiece 200. In an embodiment, the workpiece 200, subject to the application of the decorated molding article of the disclosure, may be an electronic device housing or component, a vehicle housing or component, or a combination thereof. In an alternative embodiment, the material of the outer surface 200a of the workpiece 200 may be plastic, resin, metal, carbon fiber, glass, or other various shell materials that have been formed, and for example, the workpiece may be fabricated with the required characteristics after a proper pre-treatment process. For example, when the material of the workpiece is plastic, a plastic workpiece (e.g., a plastic housing and the like) may be obtained through an injection molding mold by an injection molding process, or when the material of the workpiece is metal, a metal workpiece (e.g., a metal housing and the like) may be obtained after the metal is surface treated.

Next, proceed to step S304. A molded film is provided. For example, the molded film may be the molded film 100A shown in FIG. 2. The composition of the molded film 100A has been illustrated in the foregoing paragraphs, which is not iterated herein.

Subsequently, proceed to step S306. The workpiece 200 and the molded film 100A are disposed in a jig. Note that before step S306, the jig may be selectively designed according to the requirements of the final product, and the jig may be prepared.

Then, proceed to step S308. A high-pressure decorative molding process is performed, so that the molded film 100A is attached to the outer surface 200a of the workpiece 200. Specifically, in the high-pressure decorative molding process, a heating and softening step is first performed on the molded film 100A, for example. In one embodiment, the temperature of the heating and softening step may range from 80° C. to 150° C.; the time of the heating and softening step may range from 30 seconds to 180 seconds. Next, the molded film 100A is brought into contact with the workpiece 200, and a pressing step is performed. Subsequently, a high-pressure vacuum forming step is performed on the molded film 100A, so that the molded film 100A is attached to the workpiece 200. Finally, the remaining composite layer structure is removed selectively by die cutting, laser cutting, or waterjet cutting. In short, in the embodiment, the molded film 100A may be tightly attached to a part of the outer surface 200a of the workpiece 200 by the out mold decoration technique.

Referring to FIG. 1 again, after the decorated molding article 10 is formed, proceed to step S140, optionally. A second curing step is performed to increase the hardness of the composite layer structure 110. That is, customers can choose to implement the step S140 or not to implement the step S140 according to requirements. In an embodiment, the second curing step may include a thermal curing step, an ultraviolet (UV) curing step, a combination thereof, or other suitable curing steps. In the embodiment, the first curing step is different from the second curing step. For example, the first curing step may be a thermal curing step, and the second curing step may be a UV curing step, and vice versa. In an alternative embodiment, when the first curing step and the second curing step are both thermal curing steps, the curing temperature of the second curing step may be higher than the curing temperature of the first curing step. Note that this second curing step may cause the protective material to undergo a cross-linking reaction, so as to increase the hardness of a top surface 108a of the optical hardening layer 108, thereby enhancing the protective effect. That is, when performing the in-mold decoration or the out mold decoration technique (i.e., step S130), the optical hardening layer 108 is not yet completely cured and has ductility, and thereby it is completely attached to the outer surface 200a of the workpiece 200. After the second curing step (i.e., step S140), the optical hardening layer 108 is completely cured and has an overall protective effect. In the embodiment, the hardness of the optical hardening layer 108 may have a gradient change. Specifically, the hardness of the optical hardening layer 108 may increase from the bottom surface 108b toward the top surface 108a. That is, the hardness of the top surface 108a of the optical hardening layer 108 may be greater than the hardness of the bottom surface 108b of the optical hardening layer 108. In addition, since no laser engraving process is performed in the disclosure, the optical hardening layer 108 has a flat top surface 108a without any groove. Moreover, the second curing step may also increase the hardness of the first decoration layer 104 and the second decoration layer 106.

In the conventional spraying technology, multiple spraying steps and multiple laser engraving steps are required to form a multi-color film. The technology has disadvantages of complicated fabricating process, difficult processing, high cost, and heavy environmental pollution. Moreover, in the conventional decoration process (e.g., IMD or OMD), a hollow printing method is usually used to form the multi-color film. However, this technology may have disadvantages, such as difficult alignment, low yield, excessive material consumption, and high cost after the client undergoes processes such as blister molding, cutting, and injection molding. To solve the problems, in the embodiment of the disclosure, an all-in-one coating is formed on a substrate, a curing step is performed, and thereby a composite layer structure with a protective effect, a color effect, and a bonding effect is formed. The composite layer structure may form a molded film with better physical properties (e.g., higher hardness, better protection effect, and the like) after the blister molding process. Furthermore, compared with the conventional spraying technology or INS technology, the manufacturing steps of the decorated molding article of the disclosure are more simplified, thereby effectively reducing the manufacturing cost.

In addition, the traditional in-mold labeling (IML) technology is to perform screen printing on the backside of the substrate (e.g., PC, PMMA, ABS, etc.) to form a 3-5 decoration layers, and then form 3-10 anti-impact adhesive layers to be attached onto the workpiece. Compared with the conventional IML technology, the substrate 102 of the present embodiment will be melted due to high temperature and high pressure during the injection molding process, and then can be directly bonded to a portion of the outer surface 200a of the workpiece 200. That is, compared with the conventional IML technology, the disclosure does not need to form any additional adhesive layer, so that the manufacturing steps of the decorated molding article are simplified and the manufacturing cost is reduced.

Figure 3:
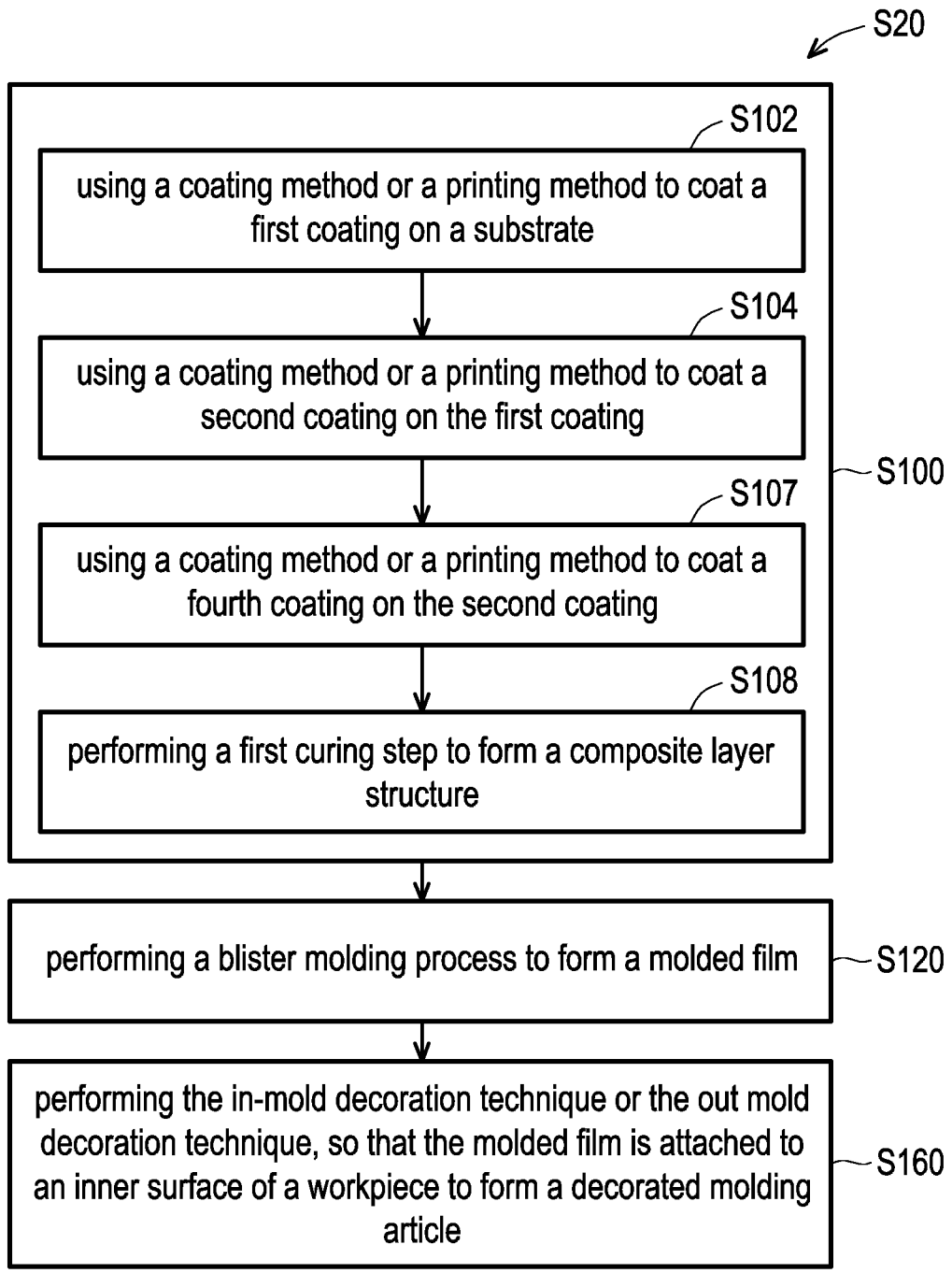
FIG. 3 is a flow chart illustrating a method of fabricating a decorated molding article according to a second embodiment of the disclosure.
Figure 4:
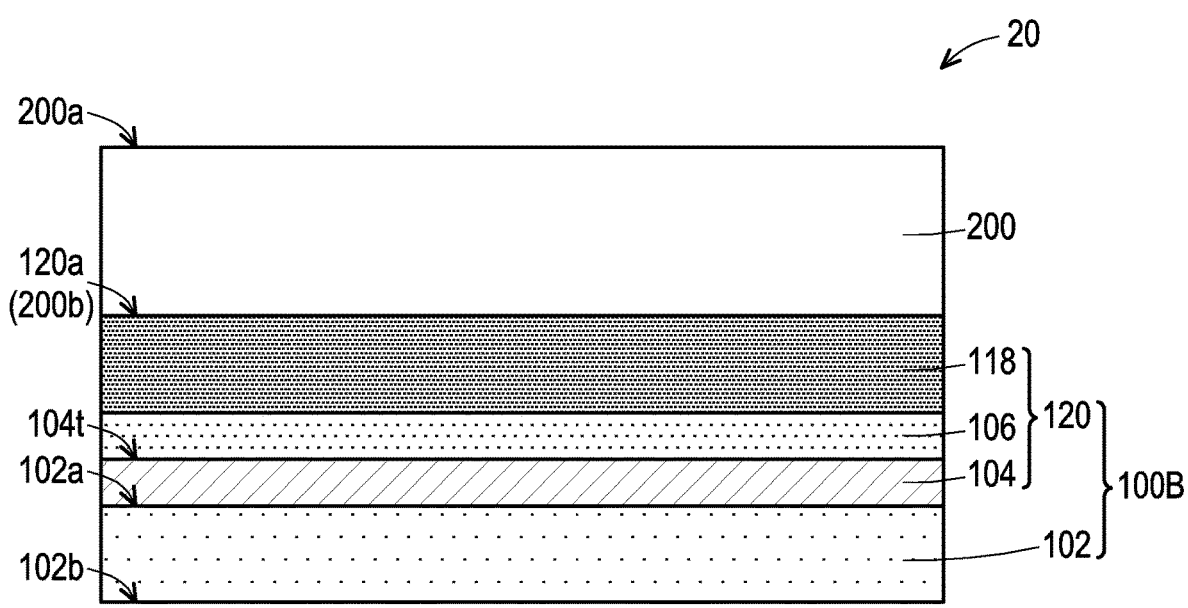
FIG. 4 is a schematic cross-sectional view of the decorated molding article according to the second embodiment of the disclosure.

FIG. 3 is a flow chart illustrating a method of fabricating a decorated molding article according to a second embodiment of the disclosure. FIG. 4 is a schematic cross-sectional view of the decorated molding article according to the second embodiment of the disclosure.

Referring to FIG. 3 and FIG. 4, the second embodiment of the disclosure provides the method S20 for fabricating a decorated molding article 20 as follows. Step S100 is performed to form a composite layer structure 120 (as shown in FIG. 4). Specifically, forming the composite layer structure 120 includes performing step S102 to form the first coating on the substrate 102 (as shown in FIG. 4) by using a coating method, a printing method, or a 3D printing method. Then, step S104 is performed to form the second coating on the first coating by using a coating method, a printing method, or a 3D printing method. Then, step S107 is performed to form a fourth coating on the second coating by using a coating method or a printing method. In an embodiment, the fourth coating at least includes a protective material, an ink material, and a bonding material uniformly mixed together. Moreover, the coating method, printing method, protective material, ink material, and bonding material have been illustrated in detail in the foregoing paragraphs, which are not iterated herein. Note that the fourth coating is used to form an anti-impact adhesive layer 118 (as shown in FIG. 4). In the embodiment, the content of the bonding material in the fourth coating may be higher than the content of the bonding material in the first coating or the second coating, so as to increase the adhesion between the composite layer structure 120 and the subsequently formed workpiece 200. As shown in FIG. 4, the composite layer structure 120 includes the first decoration layer 104, the second decoration layer 106, and the anti-impact adhesive layer 118. The first decoration layer 104 may be disposed on the first surface 102a of the substrate 102. The second decoration layer 106 may be disposed on the top surface 104t of the first decoration layer 104. The anti-impact adhesive layer 118 may be disposed on the second decoration layer 106 so that the second decoration layer 106 is disposed between the first surface 102a of the substrate 102 and the anti-impact adhesive layer 118. Further, in addition to the coating method, the anti-impact adhesive layer 118 may also be formed on the second decoration layer 106 by using a laminating method, an embossing method, a 3D printing method or a jet printing method. Compared with the ink layer or printing layer in the conventional INS that needs to be matched with the substrate bonding process and the conventional IML technology, which needs to form additional 3-10 anti-impact adhesive layers to be attached to the workpiece, the anti-impact adhesive layer of the present embodiment not only provides the color effect, but also have the high temperature resistance, the protection effect and the bonding effect, while no additional bonding process or no additional adhesive layer is required. That is, the disclosure can effectively simplify the manufacturing steps of the composite layer structure 120, and provide the composite layer structure 120 with better high temperature resistance, protection effect and bonding effect. Furthermore, compared with the conventional spraying technology, INS or IML technology, the manufacturing steps of the composite layer structure of the disclosure are more simplified, thereby effectively reducing the manufacturing cost.

After the composite layer structure 120 is formed, proceed to step S120. A blister molding process is performed to form a molded film 100B.

Subsequently, proceed to step S160. The in-mold decoration technique or the out mold decoration technique is performed, so that the molded film 100B is attached to the inner surface 200b of the workpiece 200 to form the decorated molding article 20 as shown in FIG. 4. Specifically, the inner surface 200b of the workpiece 200 is in contact with the top surface 120a of the composite layer structure 120. In the embodiment, the outer surface 200a of the workpiece 200 may be a visual surface, so that consumers may oversee the visual effect of the molded film 100B from the outer surface 200a of the workpiece 200 which has a deep crystal-like thickness texture. Moreover, the in-mold decoration and the out mold decoration technique have been illustrated in detail in the foregoing paragraphs, which are not iterated herein.

Figure 5:
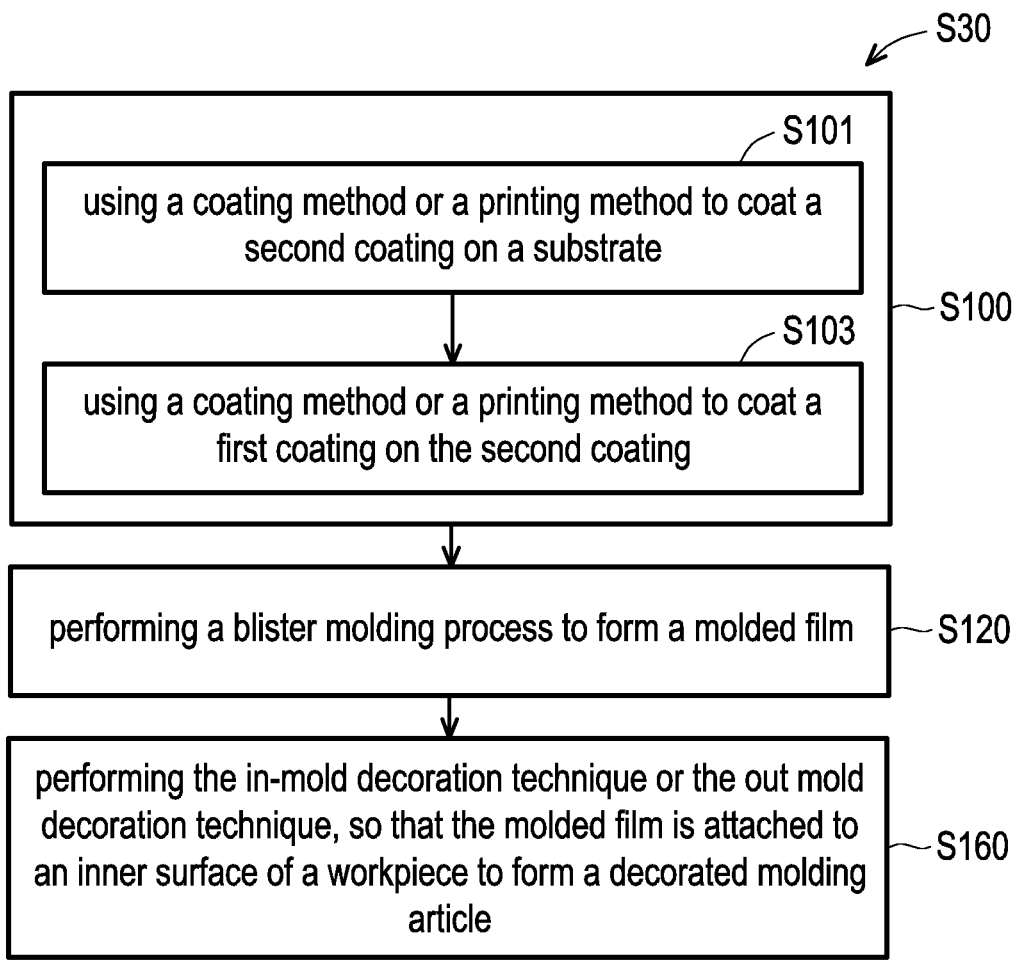
FIG. 5 is a flow chart illustrating a method of fabricating a decorated molding article according to a third embodiment of the disclosure.
Figure 6:
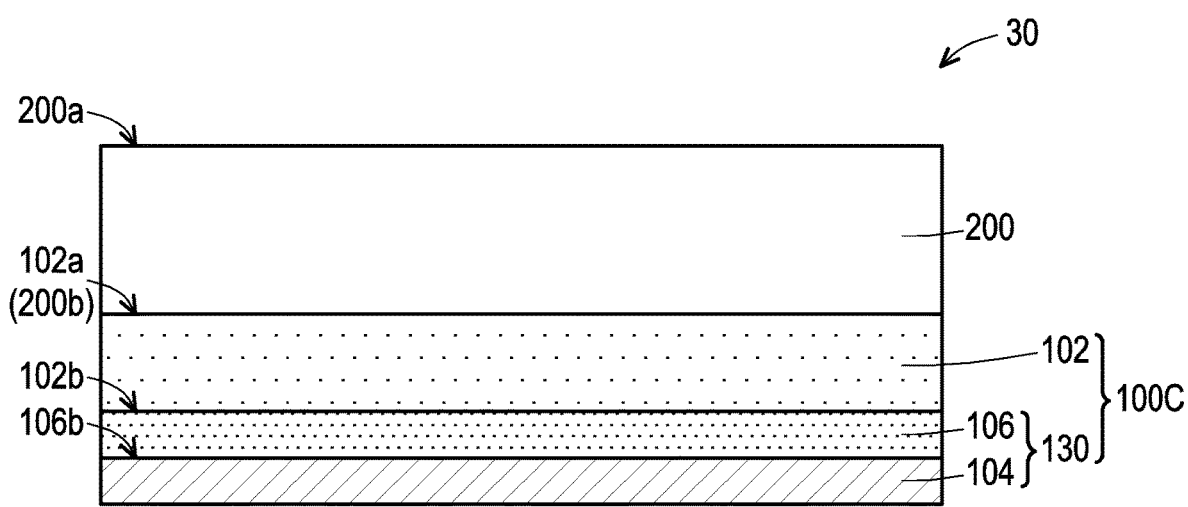
FIG. 6 is a schematic cross-sectional view of the decorated molding article according to the third embodiment of the disclosure.

FIG. 5 is a flow chart illustrating a method of fabricating a decorated molding article according to a third embodiment of the disclosure. FIG. 6 is a schematic cross-sectional view of the decorated molding article according to the third embodiment of the disclosure.

Referring to FIG. 5 and FIG. 6, the third embodiment of the disclosure provides the method S30 of fabricating a decorated molding article 30 as follows. Step S100 is performed to form a composite layer structure 130 (as shown in FIG. 6). Specifically, forming the composite layer structure 130 includes performing step S101 to coat the second coating on the substrate (as shown in FIG. 6) by using a coating method or a printing method. Then, step S103 is performed to coat the first coating on the second coating by using a coating method or a printing method. In one embodiment, the first coating is used to form the first decoration layer 104, and the second coating is used to form the second decoration layer 106 as shown in FIG. 6. In the embodiment, the first coating and the second coating do not require additional curing steps (i.e., at room temperature) to form the first decoration layer 104 and the second decoration layer 106, and therefore the composite layer structure 130 is formed. As shown in FIG. 6, the composite layer structure 130 includes the first decoration layer 104 and the second decoration layer 106. The second decoration layer 106 may be disposed on the second surface 102b of the substrate 102. The first decoration layer 104 may be disposed on the bottom surface 106b of the second decoration layer 106 so that the second decoration layer 106 is sandwiched between the second surface 102b of the substrate 102 and the first decoration layer 104. In addition, since no laser engraving process is performed in the disclosure, the first decoration layer 104 has a flat bottom surface without any groove.

After the composite layer structure 130 is formed, proceed to step S120. A blister molding process is performed to form a molded film 100C.

Subsequently, proceed to step S160. The in-mold decoration technique or the out mold decoration technique is performed, so that the molded film 100C is attached to the inner surface 200b of the workpiece 200 to form the decorated molding article 30 as shown in FIG. 6. Specifically, the inner surface 200b of the workpiece 200 is in contact with the first surface 102a of the substrate 102. In the embodiment, the outer surface 200a of the workpiece 200 may be a visual surface, so that consumers may oversee the visual effect of the molded film 100C from the outer surface 200a of the workpiece 200. Moreover, the in-mold decoration and the out mold decoration technique have been illustrated in detail in the foregoing paragraphs, which are not iterated herein.

Figure 7:
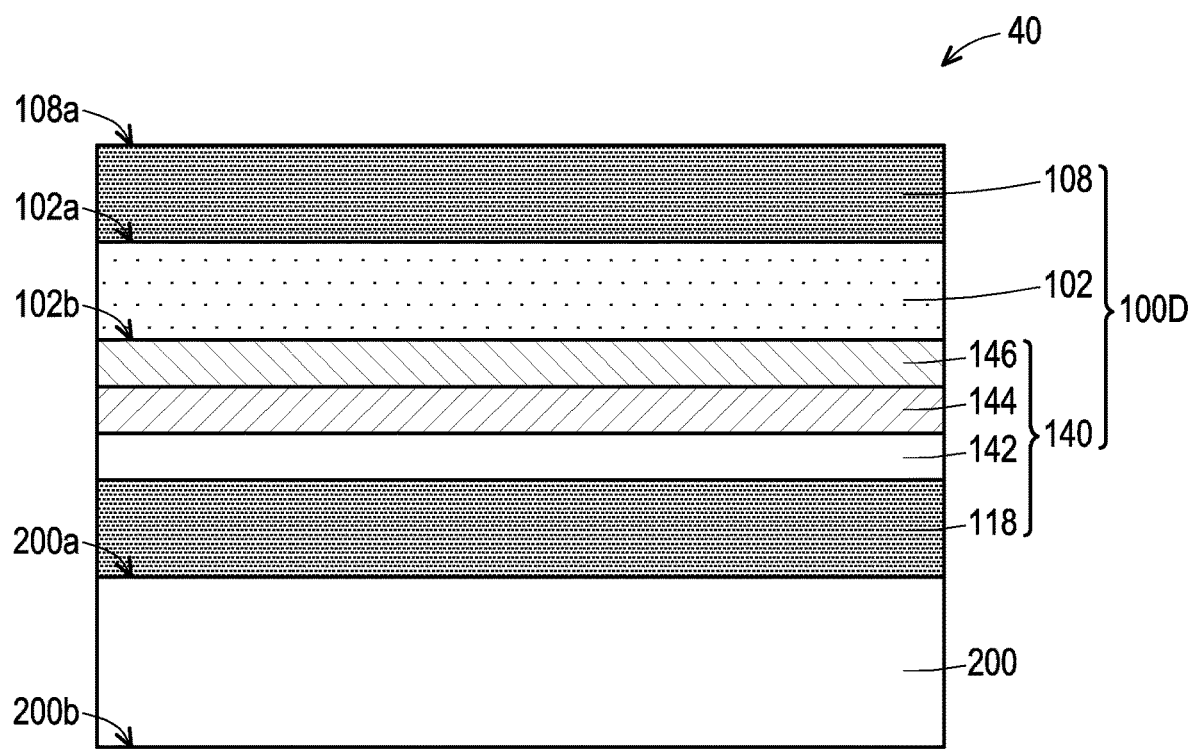
FIG. 7 is a schematic cross-sectional view of a decorated molding article according to a fourth embodiment of the disclosure.

FIG. 7 is a schematic cross-sectional view of a decorated molding article according to a fourth embodiment of the disclosure.

Referring to FIG. 7, a decorated molding article 40 of the fourth embodiment may include the workpiece 200 and a molded film 100D. The molded film 100D may be disposed on the outer surface 200a of the workpiece 200. Specifically, the molded film 100D may include the substrate 102, the optical hardening layer 108, and the composite layer structure 140. The substrate 102 has the first surface 102a and a second surface 102b opposite to each other. The optical hardening layer 108 may be disposed on the first surface 102a of the substrate 102. In the embodiment, the optical hardening layer 108 may be formed of the third coating, and the content of the protective material may be higher than the content of the protective material in the first coating or the second coating. In the embodiment, the optical hardening layer 108 may also be referred to as an all-in-one hard coating. In the embodiment, the top surface 108a of the optical hardening layer 108 may be a visual surface, so that consumers may oversee the visual effect of the molded film 100D from the top surface 108a of the optical hardening layer 108. Further, in addition to the coating method, the optical hardening layer 108 may also be formed on the first surface 102a of the substrate 102 by using a laminating method, an embossing method, a 3D printing method or a jet printing method.

Moreover, the composite layer structure 140 may be disposed on the second surface 102b of the substrate 102. Specifically, from bottom to top, the composite layer structure 140 may sequentially include the anti-impact adhesive layer 118, a buffer layer 142 (or decoration layer), a third decoration layer 144, and a fourth decoration layer 146. In the embodiment, the anti-impact adhesive layer 118 may be formed of the fourth coating, and the content of the bonding material may be higher than the content of the bonding material in the first coating or the second coating. Further, in addition to the coating method, the anti-impact adhesive layer 118 may also be formed by using a laminating method, an embossing method, a 3D printing method or a jet printing method. In one embodiment, the material of the buffer layer 142 includes polyurethane (PU) and polymethyl methacrylate (PMMA), which have the effect of preventing ink wash-off and improving the laser engraving resolution. In one embodiment, the third decoration layer 144 may be formed of the first coating, which may be printed in a single time or multiple times to present different decorative patterns such as wood grain and geometric patterns. In one embodiment, the fourth decoration layer 146 may be formed of the second coating, which may be formed on the second surface 102b of the substrate 102 by a physical vapor deposition method (e.g., an evaporation method, a sputtering method, and the like), an electroplating method, and the like. For example, the third decoration layer 144 may be a wood grain layer, and the fourth decoration layer 146 may have a vapor-deposited metal layer with a transparency of 50%, so that the composite layer structure 140 exhibits a wood grain pattern with a metallic color with a transparency of 50%. Moreover, although only two decoration layers 144 and 146 are illustrated in FIG. 7, the disclosure is not limited thereto. In other embodiments, multiple decoration layers stacked alternately may be formed according to the requirements of different effects.

Figure 8:
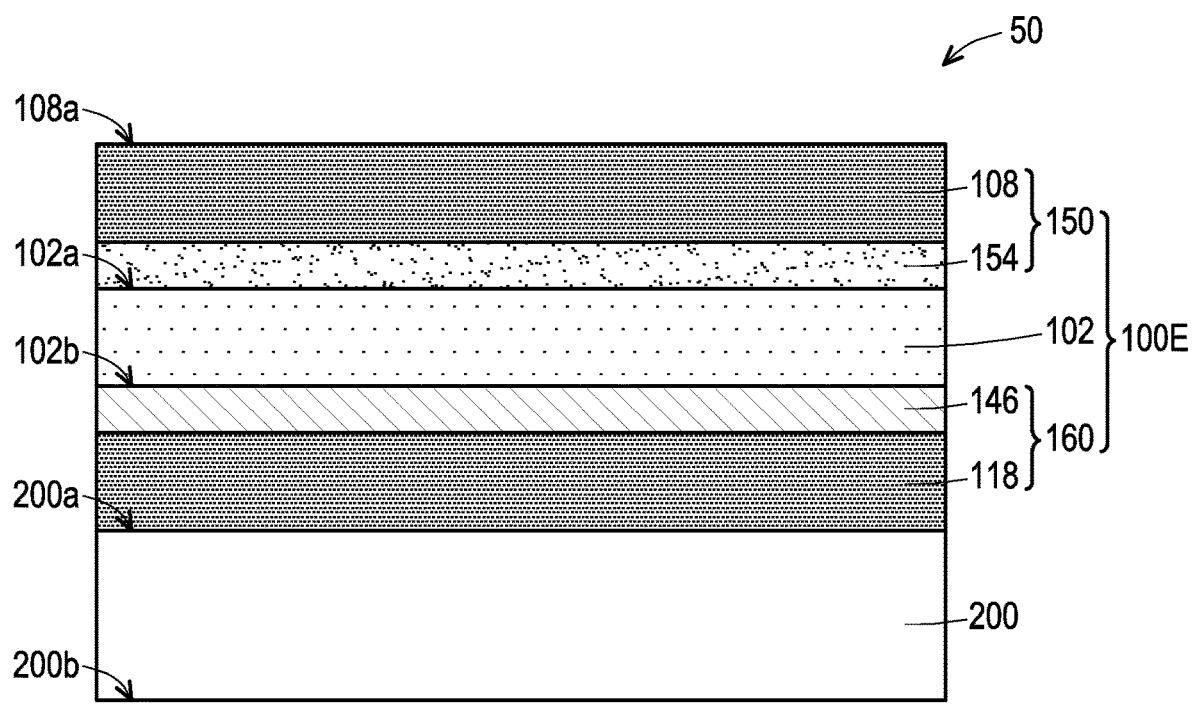
FIG. 8 is a schematic cross-sectional view of a decorated molding article according to a fifth embodiment of the disclosure.

FIG. 8 is a schematic cross-sectional view of a decorated molding article according to a fifth embodiment of the disclosure.

Referring to FIG. 8, a decorated molding article 50 of the fifth embodiment may include the workpiece 200 and a molded film 100E. The molded film 100E may be disposed on the outer surface 200a of the workpiece 200. Specifically, the molded film 100E may include the substrate 102, a first composite layer structure 150, and a second composite layer structure 160. The substrate 102 has the first surface 102a and the second surface 102b opposite to each other. The first composite layer structure 150 may be disposed on the first surface 102a of the substrate 102. The first composite layer structure 150 may include the optical hardening layer 108 and a light-transmitting layer 154. The material of the light-transmitting layer 154 includes poly methacrylic resin, which has a decoration layer effect with chemical resistance. The light-transmitting layer 154 may be in contact with the first surface 102a of the substrate 102, and the optical hardening layer 108 is disposed on the light-transmitting layer 154. In the embodiment, the top surface 108a of the optical hardening layer 108 may be a visual surface, so that consumers may oversee the visual effect of the molded film 100E from the top surface 108a of the optical hardening layer 108. In addition, since no laser engraving process is performed in the disclosure, the optical hardening layer 108 has a flat top surface 108a without any groove. Further, in addition to the coating method, the optical hardening layer 108 may also be formed by using a laminating method, an embossing method, a 3D printing method or a jet printing method.

Moreover, the second composite layer structure 160 may be disposed on the second surface 102b of the substrate 102. Specifically, the second composite layer structure 160 may include the anti-impact adhesive layer 118 and the fourth decoration layer 146. The fourth decoration layer 146 may be in contact with the second surface 102b of the substrate 102, and the anti-impact adhesive layer 118 may be disposed under the fourth decoration layer 146, so that the fourth decoration layer 146 is sandwiched between the second surface 102b of the substrate 102 and the anti-impact adhesive layer 118. In the embodiment, the fourth decoration layer 146 may be formed of the second coating, which may be formed on the second surface 102b of the substrate 102 by a physical vapor deposition method (e.g., an evaporation method, a sputtering method, and the like), an electroplating method, and the like. For example, the light-transmitting layer 154 may be a semi-transparent black layer, and the fourth decoration layer 146 may have a vapor-deposited metal layer with a transparency of 25%, so that the molded film 100E exhibits a black metallic color with a transparency of 25%. Further, in addition to the coating method, the anti-impact adhesive layer 118 may also be formed by using a laminating method, an embossing method, a 3D printing method or a jet printing method.

Figure 11:
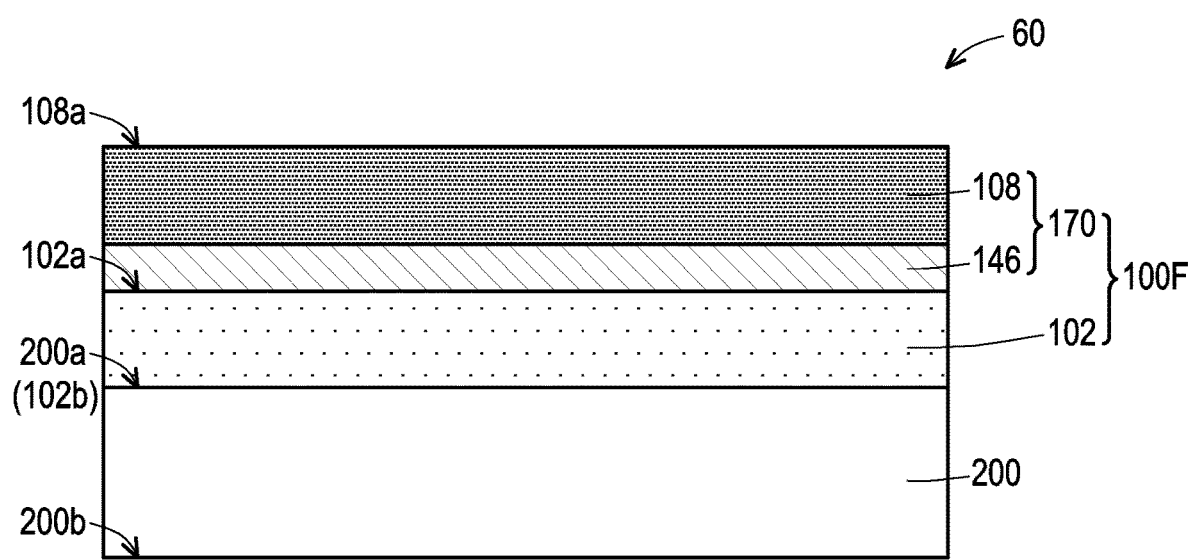
FIG. 11 is a schematic cross-sectional view of a decorated molding article according to a sixth embodiment of the disclosure.

FIG. 11 is a schematic cross-sectional view of a decorated molding article according to a sixth embodiment of the disclosure.

Referring to FIG. 11, a decorated molding article 60 of the sixth embodiment may include the workpiece 200 and a molded film 100F. The molded film 100F may be disposed on the outer surface 200a of the workpiece 200. Specifically, the molded film 100F may include the substrate 102 and a composite layer structure 170. The substrate 102 has the first surface 102a and the second surface 102b opposite to each other. The composite layer structure 170 may be disposed on the first surface 102a of the substrate 102. The composite layer structure 170 may include the fourth decoration layer 146 and the optical hardening layer 108. The fourth decoration layer 146 may be in contact with the first surface 102a of the substrate 102, and the optical hardening layer 108 is disposed on the fourth decoration layer 146. In the embodiment, the top surface 108a of the optical hardening layer 108 may be a visual surface, so that consumers may oversee the visual effect of the molded film 100F from the top surface 108a of the optical hardening layer 108. In addition, since no laser engraving process is performed in the disclosure, the optical hardening layer 108 has a flat top surface 108a without any groove. In the embodiment, the fourth decoration layer 146 may be formed of the second coating, which may be formed on the first surface 102a of the substrate 102 by a physical vapor deposition method (e.g., an evaporation method, a sputtering method, and the like), an electroplating method, and the like. The optical hardening layer 108 may have a protective effect to prevent the fourth decoration layer 146 from being scratched or damaged. Further, in addition to the coating method, the optical hardening layer 108 may also be formed by using a laminating method, an embossing method, a 3D printing method or a jet printing method.

Figure 12:
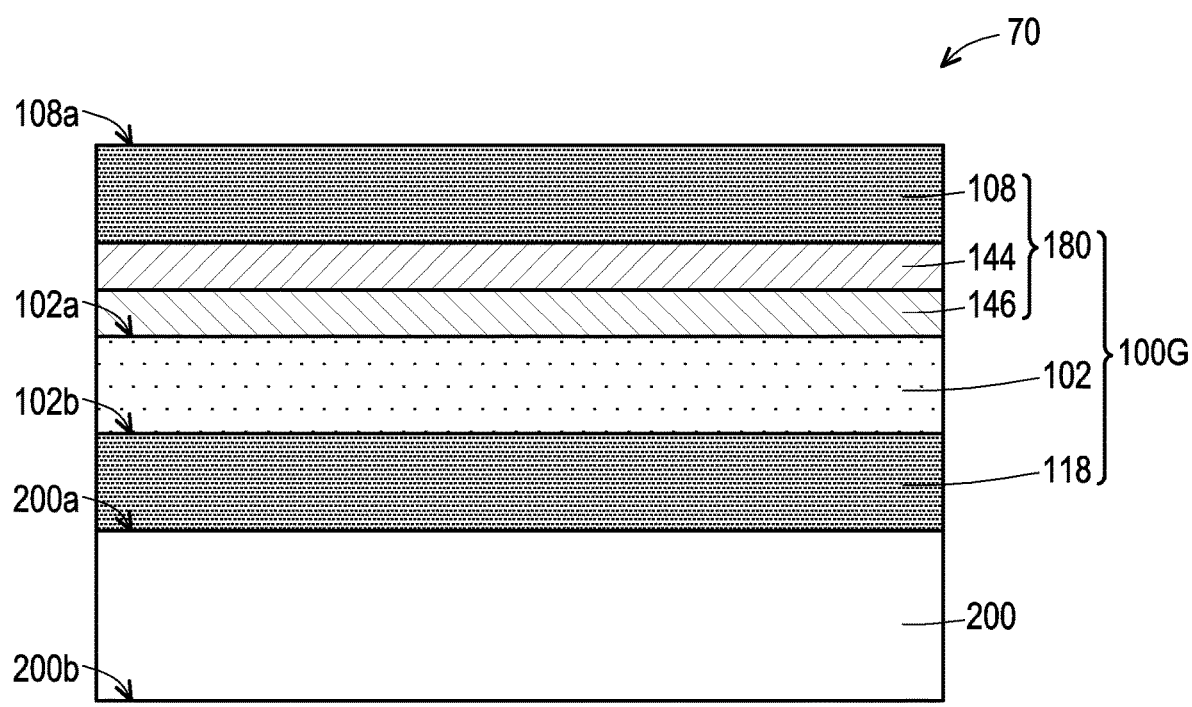
FIG. 12 is a schematic cross-sectional view of a decorated molding article according to a seventh embodiment of the disclosure.

FIG. 12 is a schematic cross-sectional view of a decorated molding article according to a seventh embodiment of the disclosure.

Referring to FIG. 12, a decorated molding article 70 of the seventh embodiment may include the workpiece 200 and a molded film 100G. The molded film 100G may be disposed on the outer surface 200a of the workpiece 200. Specifically, the molded film 100G may include the substrate 102, a composite layer structure 180, and the anti-impact adhesive layer 118. The substrate 102 has the first surface 102a and a second surface 102b opposite to each other. The composite layer structure 180 may be disposed on the first surface 102a of the substrate 102. The composite layer structure 180 may include the third decoration layer 144, the fourth decoration layer 146, and the optical hardening layer 108. The fourth decoration layer 146 may be in contact with the first surface 102a of the substrate 102. The optical hardening layer 108 may be disposed on the fourth decoration layer 146. The third decoration layer 144 may be disposed between the fourth decoration layer 146 and the optical hardening layer 108. In the embodiment, the top surface 108a of the optical hardening layer 108 may be a visual surface, so that consumers may oversee the visual effect of the molded film 100G from the top surface 108a of the optical hardening layer 108. In addition, since no laser engraving process is performed in the disclosure, the optical hardening layer 108 has a flat top surface 108a without any groove. In the embodiment, the third decoration layer 144 may be formed of the first coating, which may be printed in a single time or multiple times to present different decorative patterns such as wood grain and geometric patterns. The fourth decoration layer 146 may be formed of the second coating, which may be formed on the first surface 102a of the substrate 102 by a physical vapor deposition method (e.g., an evaporation method, a sputtering method, and the like), an electroplating method, or the like. The optical hardening layer 108 may have a protective effect to prevent the third decoration layer 144 from being scratched or damaged. On the other hand, the anti-impact adhesive layer 118 may be disposed on the second surface 102b of the substrate 102 and in contact with the second surface 102b of the substrate 102. It should be noted that the anti-impact adhesive layer 118 may also present different effects by printing a plurality of stack layers (e.g., wood grain or geometric figures) or matching anti-impact adhesive layers of different colors. In the embodiment, the molded film 100G may be attached to the outer surface 200a of the workpiece 200 through the anti-impact adhesive layer 118. Further, in addition to the coating method, the optical hardening layer 108 and the anti-impact adhesive layer 118 may also be formed by using a laminating method, an embossing method, a 3D printing method or a jet printing method.

Figure 13:
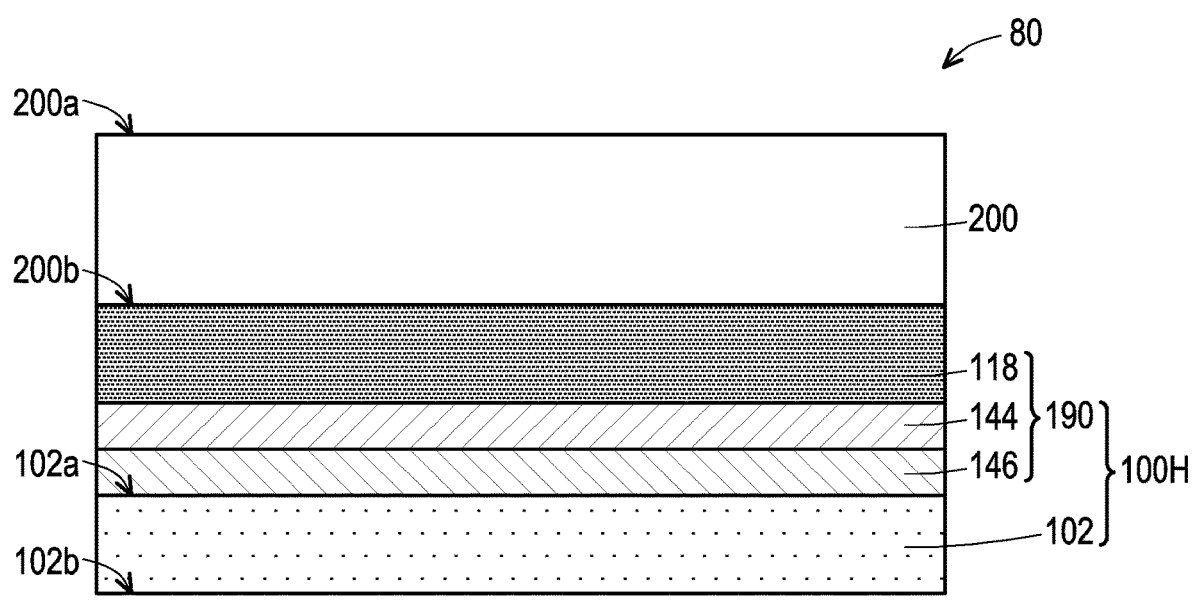
FIG. 13 is a schematic cross-sectional view of a decorated molding article according to an eighth embodiment of the disclosure.

FIG. 13 is a schematic cross-sectional view of a decorated molding article according to an eighth embodiment of the disclosure.

Referring to FIG. 13, a decorated molding article 80 of the eighth embodiment may include the workpiece 200 and a molded film 100H. The molded film 100H may be disposed on the inner surface 200b of the workpiece 200. Specifically, the molded film 100H may include the substrate 102 and a composite layer structure 190. The substrate 102 has the first surface 102a and the second surface 102b opposite to each other. The composite layer structure 190 may be disposed on the first surface 102a of the substrate 102. The composite layer structure 190 may include the third decoration layer 144, the fourth decoration layer 146, and the anti-impact adhesive layer 118. The fourth decoration layer 146 may be in contact with the first surface 102a of the substrate 102. The anti-impact adhesive layer 118 may be disposed on the fourth decoration layer 146. The third decoration layer 144 may be disposed between the fourth decoration layer 146 and the anti-impact adhesive layer 118. In the embodiment, the outer surface 200a of the workpiece 200 may be a visual surface, so that consumers may oversee the visual effect of the molded film 100H from the outer surface 200a of the workpiece 200. In the embodiment, the third decoration layer 144 may be formed of the first coating, which may be printed in a single time or multiple times to present different decorative patterns such as wood grain and geometric patterns. The fourth decoration layer 146 may be formed of the second coating, which may be formed on the first surface 102a of the substrate 102 by a physical vapor deposition method (e.g., an evaporation method, a sputtering method, and the like), an electroplating method, or the like. The anti-impact adhesive layer 118, which is transparent or has different transmittances, may have an adhesive function, so that the molded film 100H may be attached to the inner surface 200b of the workpiece 200 through the anti-impact adhesive layer 118. Further, in addition to the coating method, the anti-impact adhesive layer 118 may also be formed by using a laminating method, an embossing method, a 3D printing method or a jet printing method.

In summary, in the disclosure, the all-in-one coating is formed on the substrate and the curing step is performed to form a composite layer structure with protective effects, color effects, and bonding effects. This composite layer structure may form a molded film with better physical properties (e.g., higher hardness, better protection effect, and the like) after the blister molding process. Therefore, the molded film of the embodiments may be applied to a laser engraving process to form a variety of light-transmitting decorated molding articles. In addition, compared to the ink layer or printing layer in the conventional INS that needs to be matched with the substrate bonding process, a plurality of stacked decoration layers in the present embodiment not only provide a variety of color effects, but also have the protective effect and the bonding effect, while no additional bonding process is required. Further, compared with the conventional IML technology, which needs to form additional 3-10 anti-impact adhesive layers to be attached to the workpiece, the present embodiment does not need to form any additional adhesive layer. That is, the disclosure can effectively simplify the manufacturing steps of the composite layer structure, and provide the composite layer structure with better protective effect and the bonding effect. Furthermore, compared with the conventional spraying technology, INS technology or IML technology, the manufacturing steps of the decorated molding article of the disclosure are more simplified, thereby effectively reducing the manufacturing cost.

What is claimed is:

1. A decorated molding article, comprising:
   a workpiece; and
   a molded film attached to an outer surface of the workpiece, wherein the molded film comprises:
     a substrate, having a first surface and a second surface opposite to each other;
     a first decoration layer, disposed on the first surface of the substrate;
     a second decoration layer, disposed on the first decoration layer; and
     an optical hardening layer, disposed on the second decoration layer, wherein the first decoration layer, the second decoration layer, and the optical hardening layer each comprise a protective material, an ink material, and a bonding material, the optical hardening layer has a flat top surface, and the protective material comprises polymethyl methacrylate (PMMA), aliphatic urethane diacrylate, epoxy acrylate (EA), polyester polyol, or a combination thereof.

2. The decorated molding article according to claim 1, wherein a content of the protective material in the optical hardening layer is higher than a content of the protective material in the first decoration layer, and higher than a content of the protective material in the second decoration layer.

3. A decorated molding article, comprising:
   a workpiece; and
   a molded film attached to an outer surface of the workpiece, wherein the molded film comprises:
     a substrate, having a first surface and a second surface opposite to each other;
     an optical hardening layer, disposed on the first surface of the substrate;
     a plurality of decoration layers, disposed on the second surface of the substrate; and
     an anti-impact adhesive layer, disposed between the plurality of decoration layers and the outer surface of the workpiece, wherein the plurality of decoration layers, the optical hardening layer, and the anti-impact adhesive layer each comprise a protective material, an ink material, and a bonding material, the protective material comprises polymethyl methacrylate (PMMA), aliphatic urethane diacrylate, epoxy acrylate (EA), polyester polyol, or a combination thereof, and a content of the bonding material in the anti-impact adhesive layer is higher than a content of the bonding material in the plurality of decoration layers.

4. A decorated molding article, comprising:
   a workpiece; and
   a molded film attached to an outer surface of the workpiece, wherein the molded film comprises:
     a substrate, having a first surface and a second surface opposite to each other;
     a first composite layer structure, disposed on the first surface of the substrate, wherein the first composite layer structure comprises a transmitting layer and an optical hardening layer, wherein the optical hardening layer has a flat top surface; and
     a second composite layer structure, disposed on the second surface of the substrate, wherein the second composite layer structure comprises a decoration layer and an anti-impact adhesive layer, the anti-impact adhesive layer is in contact with the outer surface of the workpiece, the decoration layer, the optical hardening layer, and the anti-impact adhesive layer each comprise a protective material, an ink material, and a bonding material, the protective material comprises polymethyl methacrylate (PMMA), aliphatic urethane diacrylate, epoxy acrylate (EA), polyester polyol, or a combination thereof, and a content of the bonding material in the anti-impact adhesive layer is higher than a content of the bonding material in the decoration layer.

5. A decorated molding article, comprising:
a workpiece; and
a molded film attached to an outer surface of the workpiece, wherein the molded film comprises:
  a substrate, having a first surface and a second surface opposite to each other;
  a decoration layer, disposed on the first surface of the substrate; and
  an optical hardening layer, disposed on the decoration layer, wherein the second surface of the substrate is in contact with the outer surface of the workpiece, the decoration layer and the optical hardening layer each comprise a protective material, an ink material, and a bonding material, the protective material comprises polymethyl methacrylate (PMMA), aliphatic urethane diacrylate, epoxy acrylate (EA), polyester polyol, or a combination thereof, the optical hardening layer has a flat top surface, and a content of the protective material in the optical hardening layer is higher than a content of the protective material in the decoration layer.

6. A decorated molding article, comprising:
a workpiece; and
a molded film attached to an outer surface of the workpiece, wherein the molded film comprises:
  a substrate, having a first surface and a second surface opposite to each other;
  a first decoration layer, disposed on the first surface of the substrate;
  a second decoration layer, disposed between the first decoration layer and the first surface of the substrate;
  an optical hardening layer, disposed on the first decoration layer, wherein the optical hardening layer has a flat top surface; and
  an anti-impact adhesive layer, disposed on the second surface of the substrate, and being in contact with the outer surface of the workpiece, wherein the first decoration layer, the second decoration layer, the optical hardening layer, and the anti-impact adhesive layer each comprise a protective material, an ink material, and a bonding material, and the protective material comprises polymethyl methacrylate (PMMA), aliphatic urethane diacrylate, epoxy acrylate (EA), polyester polyol, or a combination thereof, and a content of the bonding material in the anti-impact adhesive layer is higher than a content of the bonding material in the first decoration layer, and higher than a content of the bonding material in the second decoration layer.

7. A decorated molding article, comprising:
a workpiece; and
a molded film attached to an inner surface of the workpiece, wherein the molded film comprises:
  a substrate, having a first surface and a second surface opposite to each other;
  a first decoration layer, disposed on the first surface of the substrate;
  a second decoration layer, disposed on the first decoration layer; and
  an anti-impact adhesive layer, disposed on the second decoration layer, wherein the first decoration layer, the second decoration layer, and the anti-impact adhesive layer each comprise a protective material, an ink material, and a bonding material, the protective material comprises polymethyl methacrylate (PMMA), aliphatic urethane diacrylate, epoxy acrylate (EA), polyester polyol, or a combination thereof, and a content of the bonding material in the anti-impact adhesive layer is higher than a content of the bonding material in the first decoration layer, and higher than a content of the bonding material in the second decoration layer.

8. A decorated molding article, comprising:
a workpiece; and
a molded film attached to an inner surface of the workpiece, wherein the molded film comprises:
  a substrate, having a first surface and a second surface opposite to each other, wherein the first surface of the substrate is in contact with the inner surface of the workpiece;
  a first decoration layer, disposed on the second surface of the substrate; and
  a second decoration layer, disposed between the first decoration layer and the substrate, wherein the first decoration layer has a flat top surface, the first decoration layer and the second decoration layer each comprise a protective material, an ink material, and a bonding material, and the protective material comprises polymethyl methacrylate (PMMA), aliphatic urethane diacrylate, epoxy acrylate (EA), polyester polyol, or a combination thereof.

9. The decorated molding article according to claim 8, wherein the first decoration layer and the second decoration layer have different ink materials.

10. A decorated molding article, comprising:
a workpiece; and
a molded film attached to an inner surface of the workpiece, wherein the molded film comprises:
  a substrate, having a first surface and a second surface opposite to each other;
  a first decoration layer, disposed on the first surface of the substrate;
  a second decoration layer, disposed between the first decoration layer and the first surface of the substrate; and
  an anti-impact adhesive layer, disposed on the first decoration layer, so that a top surface of the anti-impact adhesive layer is in contact with the inner surface of the workpiece, wherein the first decoration layer, the second decoration layer, and the anti-impact adhesive layer each comprise a protective material, an ink material, and a bonding material, the protective material comprises polymethyl methacrylate (PMMA), aliphatic urethane diacrylate, epoxy acrylate (EA), polyester polyol, or a combination thereof, and a content of the bonding material in the anti-impact adhesive layer is higher than a content of the bonding material in the first decoration layer, and higher than a content of the bonding material in the second decoration layer.

\* \* \* \* \*